United States Patent [19]
Zaremski et al.

[11] 3,830,634
[45] Aug. 20, 1974

[54] TRIM MEMBERS AND PRODUCTION THEREOF

[75] Inventors: Donald R. Zaremski, Cheswick; Jack M. Beigay, Freeport, both of Pa.

[73] Assignee: Allegheny Ludlum Industries, Inc., Pittsburgh, Pa.

[22] Filed: Mar. 29, 1972

[21] Appl. No.: 239,146

[52] U.S. Cl. ............................ 29/191.6, 204/197
[51] Int. Cl. .......................................... B23p 3/00
[58] Field of Search .................. 29/191.6; 204/197

[56] References Cited
UNITED STATES PATENTS

| | | | |
|---|---|---|---|
| 2,157,180 | 5/1939 | Little | 204/197 |
| 3,152,059 | 10/1964 | Wellington | 204/197 |
| 3,484,350 | 12/1969 | Zaremski | 204/197 X |
| 3,536,459 | 10/1970 | Bates | 29/191.6 |

*Primary Examiner*—A. B. Curtis
*Assistant Examiner*—O. F. Crutchfield
*Attorney, Agent, or Firm*—Vincent G. Gioia; Robert F. Dropkin

[57] ABSTRACT

A stainless steel trim member, a method of making a stainless steel trim member and an assembly comprised of a stainless steel trim member in combination with a metallic body member. The stainless steel trim member has an exposed surface, a contact surface which converges with the exposed surface, a connecting surface which joins the exposed surface and the contact surface, and an inner surface opposite the exposed, contact and connecting surfaces. Adhered to the inner surface is a layer of sacrificial metal. The sacrificial metal is exposed through a perforation which extends into the contact and/or connecting surfaces of the stainless steel.

17 Claims, 3 Drawing Figures

PATENTED AUG 20 1974 3,830,634

TRIM MEMBERS AND PRODUCTION THEREOF

The present invention relates to a stainless steel trim member, to a method of making a stainless steel trim member, and to an assembly having a stainless steel trim member as an integral part thereof.

Stainless steel is known to serve a particularly good purpose in those applications where brightness and stain resistance to a variety of contaminants is required and is ideally suited for use as automotive trim. However, since most automotive bodies are constructed of carbon steel, the use of stainless steel can result in galvanic corrosion. Carbon steel is anodic to stainless steel and generally corrodes in the vicinity of stainless steel in the presence of an electrolyte, such as moisture.

To protect carbon steel automotive bodies, it has been the practice to coat stainless strips with a non-ferrous sacrificial metal; e.g. aluminum, which is anodic to plain carbon steel, prior to or after forming the strips into trim members. At the present time, the preferred method involves the application of sacrificial metal to those sections of the strip which eventually contact the automotive body, i.e., the return flange of the fabricated trim member. Another method, which has not proved satisfactory, involves the application of sacrificial metal to the inner surface of the stainless steel trim. An improvement upon this method is disclosed in U.S. Pat. No. 3,536,459 which issued on Oct. 27, 1970. It involves the application of sacrificial metal to the inner surface of the stainless steel and the application of a layer of non-conductive material along its contact surface, but disadvantageously requires two bonding and/or coating operations. In this application, we teach still another improvement upon this second method, and one which does not require a coating of non-conductive material. We have found that the protection offered by an inner coating of sacrificial metal can be materially improved if the stainless steel is perforated so as to expose the sacrificial metal where it is most needed.

It is accordingly an object of this invention to provide a stainless steel trim member.

It is another object of this invention to provide a method for making a stainless steel trim member.

It is a further object of this invention to provide an assembly having a stainless steel trim member as an integral part thereof.

The foregoing and other objects of the invention will be best understood from the following description, reference being had to the accompanying drawing wherein.

The present invention encompasses a stainless steel trim member, a method of making a stainless steel trim member, and an assembly comprised of a stainless steel trim member in combination with a metallic body member. The metallic body member is generally part of an automotive body and therefore a body of plain carbon steel. At all times, it is, however, formed from a metal which is less noble in the electromotive series than is stainless steel. In the context of this application, metallic body members are interpreted as including metal which is painted and/or coated, as well as bare.

The stainless steel trim member has an exposed surface, a contact surface which converges with the exposed surface, a connecting surface which joins the exposed surface and the contact surface, and an inner surface opposite the exposed, contact and connecting surfaces. The exposed surface is disposed to be visible and the contact surface abuts the body member after assembly. Adhered to the inner surface is a layer of sacrificial metal. The sacrificial metal is generally from the group consisting of aluminum, zinc, cadmium, magnesium, and base alloy thereof, and is generally at least 0.5 mil thick. Aluminum is the preferred sacrificial metal. A Preferred minimum thickness for the sacrificial metal is 3 mils. To expose sacrificial metal where it is most needed, at least one perforation is present within the contact and/or connecting surface. The perforation can be a relatively long continuous slit, a series of discontinuous slits or any other configuration which comes to mind.

Figure 1:
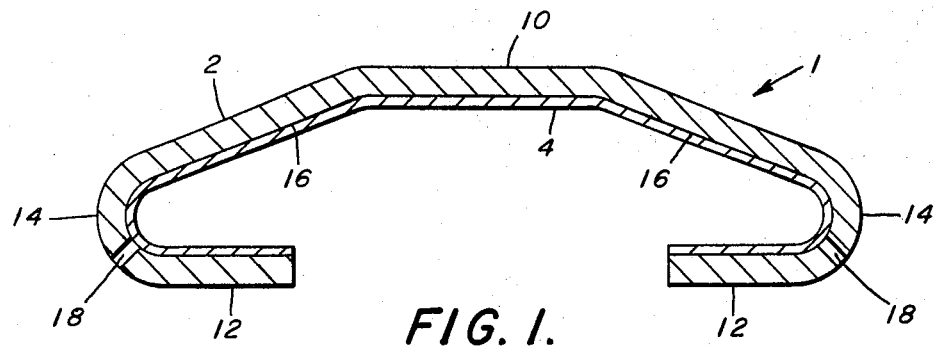
FIG. 1 is a sectional view of a stainless steel trim member.
Figure 2:
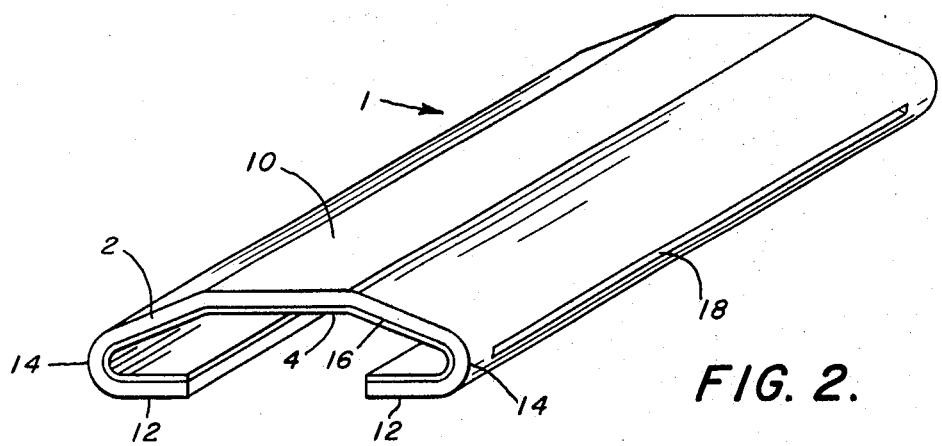
FIG. 2 is a perspective view of a stainless steel trim member.

FIGS. 1 and 2 are respectively a sectional and perspective view of a stainless steel trim member 1, which meets the requirements of this invention. It is comprised of stainless steel 2 and sacrificial metal 4. The stainless has an exposed surface 10, a contact surface 12, a connecting surface 14, an inner surface 16 and perforations 18 in the form of a continuous slit.

Figure 3:
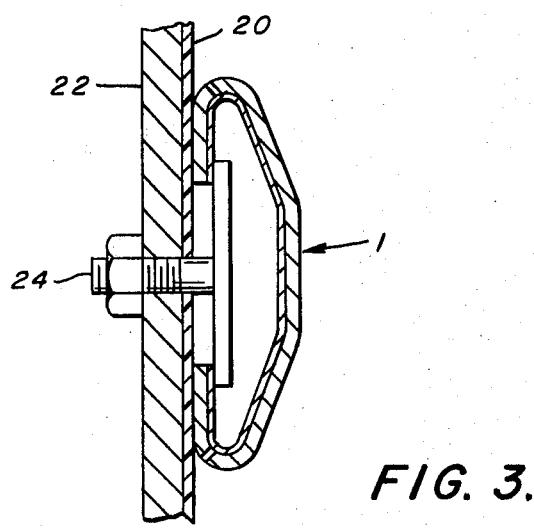
FIG. 3 is a sectional view of a stainless steel trim member mounted on an automotive body.

FIG. 3 illustrates one manner of attaching the trim member to an automotive body. The trim member is held against automotive panel 22 by means of clips 24. Adhered to panel 22 is a layer of paint 20.

The method of this invention comprises the steps of shaping a stainless steel sheet into a trim member having an exposed surface, a contact surface converging with the exposed surface, a connecting surface joining the exposed surface and the contact surface and an inner surface opposite the exposed, contact and connecting surfaces, adhering a layer of metal (generally before shaping), less noble in the electromotive series than plain carbon steel, to the stainless steel so that the inner surface of the trim member will have a layer of sacrificial metal thereon, and perforating the stainless steel so that the sacrificial metal will be exposed through the second surface and/or the connecting surface. Any of the well known methods of shaping; e.g., roll forming, and adhering; e.g., roll bonding and adhesive bonding, are within the scope of the invention. Perforating can occur before or after shaping, and slitting is the preferred mode thereof.

The following examples illustrate several aspects of the invention.

Stainless steel - aluminum laminates were attached to painted automotive steel panels with standard automotive, zinc chromated steel clips, and subjected to a seacoast environment. The laminates were 22.5 mils thick and the aluminum was 40 percent of their thickness or 9 mils thick. Half of the laminates were roll bonded and half were adhesively bonded. The steel panels had five small holes (about 0.020 inch in diameter) punched through the paint in the area of the top crevice of each trim member/body steel assembly. Several of the laminates were perforated through the stainless steel to expose the aluminum. Some of them had a continuous slit along their length and others had a series of one-quarter inch long slits.

The laminates were subjected to the seacoast environment, along with several solid stainless steel control samples, for periods of 4 weeks at distances of approximately 80 and 800 feet from the water's edge, and for periods of 4 months at a distance of 80 feet. The results of the test are reproduced hereinbelow in Table I.

TABLE I

| Laminate No. | Type of Bond | Type of Perforation | Protection provided as compared to control samples (%) | |
|---|---|---|---|---|
| | | | Four weeks exposure Average of results from 80 feet and 800 feet | Four months exposure (80 feet) |
| 1 | Roll | None | 3.5 | 26 |
| 2 | Adhesive | None | 26 | 43 |
| 3 | Roll | continuous slit | 60 | 73 |
| 4 | Roll | one-quarter inch long slits | 70 | 47 |
| 5 | Adhesive | continuous slit | 60 | 91 |
| 6 | Adhesive | one-quarter inch long slits | 67 | 67 |

From Table I, it becomes clearly evident that perforations materially retard galvanic action between stainless steel trim members and structures to which they are connected. Perforated laminates 3 through 6 offered significantly more protection than did laminates 1 and 2 which were not perforated.

It will be apparent to those skilled in the art that the novel principles of the invention disclosed herein in connection with specific examples thereof, will suggest various other modifications and application of the same. It is accordingly desired that in construing the breadth of the appended claims they shall not be limited to the specific examples of the invention disclosed herein.

We claim:

1. An assembly comprised of a stainless steel trim member in combination with a first metal less noble in the electromotive series than stainless steel: said trim member having an exposed surface, a contact surface abutting said first metal and converging with said exposed surface, a connecting surface joining said exposed surface and said contact surface, and an inner surface opposite said contact, exposed and connecting surfaces; said inner surface having a coating of a sacrificial metal which is less noble in the electromotive series than said first metal; at least one perforation in said contact surface and/or said connecting surface; said perforation extending through said stainless steel, thereby exposing said sacrificial metal therethrough; said sacrificial metal acting to preclude galvanic action between said first metal and stainless steel, said perforation being of sufficient size to render said sacrificial metal significantly more effective in precluding said galvanic action between said first metal and stainless steel than would said sacrificial metal be in a like trim member devoid of said perforation.

2. An assembly according to claim 1 wherein said first metal is plain carbon steel.

3. An assembly according to claim 2 wherein said sacrificial metal is from the group consisting of aluminum, zinc, cadmium, magnesium and base alloys thereof.

4. An assembly according to claim 3 wherein said sacrificial metal is aluminum.

5. An assembly according to claim 1 wherein said coating has a thickness in excess of 0.5 mil.

6. An assembly according to claim 5 wherein said coating has a thickness in excess of 3 mils.

7. A composite article comprising a stainless steel trim member and a layer of sacrificial metal, less noble in the electromotive series than plain carbon steel, adhered thereto: said trim member having a first surface disposed to be visible, a second surface, a connecting surface joining said first and second surfaces, and an inner surface opposite said first, second and connecting surfaces; said inner surface having said layer of sacrificial metal adhered thereto; at least one perforation in said second surface and/or said connecting surface; said perforation extending through said stainless steel, thereby exposing said sacrificial metal therethrough; said sacrificial metal acting to preclude galvanic action between said trim member and a metallic body member when said trim member and body member are brought into contact, said perforation being of sufficient size to render said sacrificial metal significantly more effective in precluding said galvanic action between said trim member and body member than would said sacrificial metal be in a like trim member devoid of said perforation.

8. A composite article according to claim 7 wherein said sacrificial metal is from the group consisting of aluminum, zinc, cadmium, magnesium and base alloys thereof.

9. A composite article according to claim 8 wherein said sacrificial metal is aluminum.

10. A composite article according to claim 7 wherein said layer of sacrificial metal has a thickness in excess of 0.5 MIL.

11. A composite article according to claim 10 wherein said layer of sacrificial metal has a thickness in excess of 3 mils.

12. In the method of producing a stainless steel trim member, wherein a stainless steel strip is shaped into a trim member having a first surface disposed to be visible, a second surface converging with said first surface, a connecting surface joining said first and second surfaces, and an inner surface opposite said first, second and connecting surfaces, the improvement which comprises: adhering a layer of metal, less noble in the electromotive series than plain carbon steel, to said stainless steel so that said inner surface of said trim member will have a layer of sacrificial metal thereon, and perforating said stainless steel so that said sacrificial metal will be exposed through said second surface and/or said connecting surface; said stainless steel trim member having a make-up which acts to preclude galvanic action between it and structures to which it is connected, said perforation being of sufficient size to give said trim member a make-up which is significantly more effective in precluding galvanic action between it and structures to which it is connected than are the make-up of like trim members devoid of said perforation.

13. A method according to claim 12 wherein said sacrificial metal is from the group consisting of aluminum, zinc, cadmium, magnesium and base alloys thereof.

14. A method according to claim 13 wherein said sacrificial metal is aluminum.

15. A method according to claim 12 wherein said layer of metal has a thickness in excess of 0.5 mil.

16. A method according to claim 15 wherein said layer of metal has a thickness in excess of 3 mils.

17. A method according to claim 12 wherein said perforating is a slitting operation.

* * * * *